United States Patent [19]

Kim et al.

[11] Patent Number: 5,285,434
[45] Date of Patent: Feb. 8, 1994

[54] OBJECTIVE LENS DRIVING APPARATUS FOR OPTICAL PICKUP

[75] Inventors: Chun-dong Kim; Yeong-Kuk Yun; Hak-hyun Jang, all of Suwon, Rep. of Korea

[73] Assignee: SamSung Electronics Co. Ltd., Suwon, Rep. of Korea

[21] Appl. No.: 864,657

[22] Filed: Apr. 7, 1992

[30] Foreign Application Priority Data

May 13, 1991 [KR] Rep. of Korea .................... 91-7717

[51] Int. Cl.$^5$ ............................................. G11B 7/00
[52] U.S. Cl. ............................ 369/44.14; 369/44.15; 359/814
[58] Field of Search ............... 369/44.14, 44.15, 44.16; 359/811, 813, 814, 823, 824

[56] References Cited

U.S. PATENT DOCUMENTS

| | | | |
|---|---|---|---|
| 4,818,066 | 4/1989 | Nose | 369/44.16 |
| 4,878,214 | 10/1989 | Hinotani | 369/44.15 |
| 5,046,821 | 9/1991 | Seino | 359/813 |
| 5,056,891 | 10/1991 | Masunago | 369/44.15 |
| 5,128,806 | 7/1992 | Ohno | 369/44.15 |

FOREIGN PATENT DOCUMENTS

| | | | |
|---|---|---|---|
| 62-031038 | 2/1987 | Japan | 369/44.15 |
| 62-149044 | 7/1987 | Japan | 369/44.16 |
| 63-167436 | 7/1988 | Japan | 369/44.14 |
| 01017226 | 1/1989 | Japan | 359/814 |

*Primary Examiner*—Andrew L. Sniezek
*Assistant Examiner*—P. W. Huber
*Attorney, Agent, or Firm*—Robert E. Bushnell

[57] ABSTRACT

An objective lens driving apparatus includes a lens holder holding an objective lens, a focusing coil wound around the vertical outer periphery of the lens holder, yoke members each constituted by an inner yoke and an outer yoke, permanent magnets each retained on the outer yoke to oppose the focusing coils, and tracking coil fixed to the focusing coil. Each tracking coil is twice bent at right angles to wrap around the front, rear and one side of the inner yoke. Electromagnetic forces generated from each upper and lower parts of the tracking coil when the lens holder moves in the horizontal direction, and capable of causing the rolling of the lens holder, offset each other, so that the position of the lens holder is controlled without its axis being inclined and the driving range of the lens holder is wide.

18 Claims, 4 Drawing Sheets

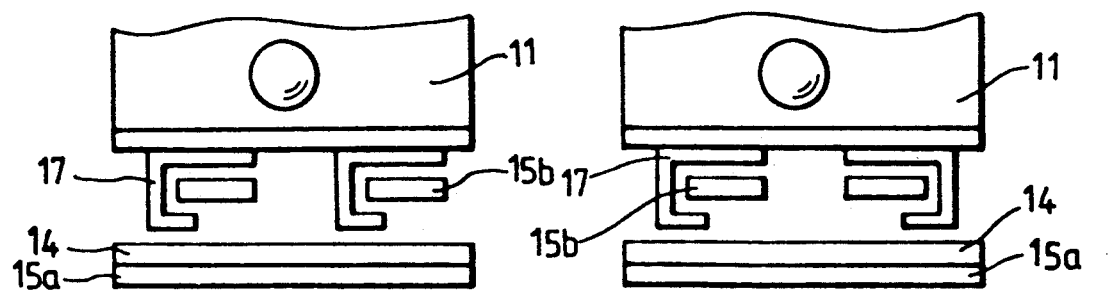
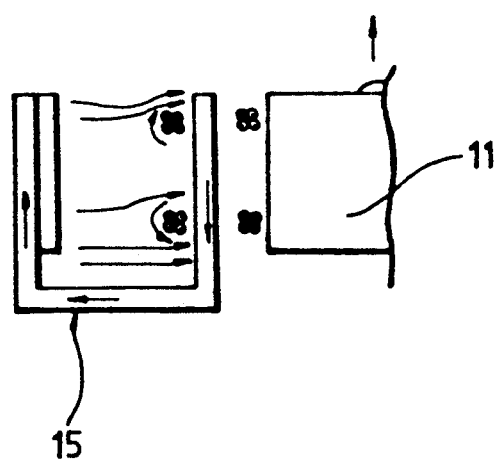

OBJECTIVE LENS DRIVING APPARATUS FOR OPTICAL PICKUP

BACKGROUND OF THE INVENTION

The present invention relates to an objective lens driving apparatus for an optical pickup for use in an optical disc player such as a compact disc player (CDP) and a video disc player (VDP), and more particularly to an objective lens driving apparatus for improving the structure of a tracking coil wherein current for controlling the tracking of optical recording media is supplied to control the tracking accurately.

Generally, players using optical recording media such as a CDP and a VDP, include an optical pickup for injecting light beams and detecting the light beams reflected from the information recorded surface of an optical disc. The optical pickup comprises an objective lens, a lens holder, tracking coils, a focusing coil, a permanent magnet and a light source. The objective lens is held by the lens holder, the focusing coil is wound around the vertical outer periphery of the lens holder, and the tracking coils are fixed on the focusing coil. The permanent magnet is located outside the focusing coil and the tracking coils, and is opposed to the above two coils. The light source is installed on the lower part of the lens holder, and the beam irradiated from the light source is projected to the information recorded surface of the optical disc via the objective lens.

In such an optical pickup, a current signal obtained from a detecting beam reflected from the information-recorded surface of the optical disc during recording-/reproducing, is supplied into the focusing coil and the tracking coils, so that a servo control for correcting the location of the objective lens by the electromagnetic circuit which is formed by the coils and a permanent magnet is performed. However, such an optical pickup traces a fine error signal to correct the light beam to be precisely projected on the accurate information track of the optical disc, so that a high accuracy is required. Accordingly, when correcting the location of the track of the objective lens, it becomes necessary to prevent the lens holder from rolling due to an electromagnetic force unnecessary for controlling the tracking, due to the structure of the tracking coils.

FIG. 1 is a partially cut-away perspective view showing a conventional objective lens driving apparatus for the optical pickup.

Referring to FIG. 1, reference numeral 1 designates an objective lens opposed to an optical disc (not shown). Objective lens 1 is held by a lens holder 2. Lens holder 2 is finely movably supported by four supporting rods 4 attached to a fixed member 3. Each supporting rod 4 is formed of elastic material such as rubber. A focusing coil 5 is wound around a vertical outer periphery of lens holder 2, and tracking coils 6, in a rectangular shape, are fixed to an outer periphery of focusing coil 5. A pair of permanent magnets 8 retained by yokes 7 are located outside focusing coil 5 and tracking coils 6 to oppose the above coils.

In the conventional objective lens driving apparatus for the optical pickup as mentioned above, lens holder 2 is driven by an electromagnetic circuit made by the current flowing in focusing coil 5 and the magnetic force of permanent magnets 8, so that the focusing correction in the direction of an optical axis of objective lens 1 (Y-axis), is performed. Further, lens holder 2 is driven by an electromagnetic circuit made by the current flowing in both sides of tracking coils 6 and the magnetic force of permanent magnets 8, so that lens holder 2 is positionally corrected in the direction along the information recorded surface of the optical disc (X-axis). In such a tracking correction operation, an electromagnetic force unnecessary for controlling the track of lens holder 2 is generated in the upper and lower parts of each tracking coil 6. That is, if the direction of a magnetic field (direction B) and the direction of a current (represented by dotted lines) flowing in tracking coils 6 are the same as that in FIG. 1, electromagnetic forces F1 and F2 are generated in the upper parts of each tracking coil 6 and electromagnetic forces F3 and F4 are generated in the lower parts of each tracking coil 6. Electromagnetic forces F5 versus F6 and F5 versus F7 having opposite directions are generated along the X-axis on both sides of each tracking coil 6. Electromagnetic forces F1 and F2 and F3 & F4 generate opposite turning forces in the upper and lower parts of each tracking coil 6.

However, as shown in FIG. 2, when lens holder 2 moves in the Y-axis by a focusing correction signal, the magnetic flux density of the upper parts of each tracking coil 6 differs from that of the lower parts. Accordingly, the electromagnetic forces generated in the upper and lower parts of each tracking coil 6, causes a difference in the turning forces such that lens holder 2 is inclined. As a result, since lens holder 2 of the optical pickup, which demands high accuracy in correcting the location, loses balance thus the light beam is emitted while being inclined with respect to the disc surface, so that accuracy is lowered. Also, an electromagnetic force F5 in the inner parts and electromagnetic forces F6 and F7 in the outer parts, both generated by the current flowing in the vertical portions of each tracking coil 6, are generated in opposite directions. Therefore, lens holder 2 is driven in the X-axis by the difference, so that the driving region of lens holder 2 is narrowed.

SUMMARY OF THE INVENTION

To solve the above problem, it is an object of the present invention to provide an objective lens driving apparatus for an optical pickup which provides a tracking coil capable of offsetting the electromagnetic forces unnecessary for a tracking-control and to control the tracking without the optical axis being inclined, when to control the tracking, an objective lens finely moves in the direction parallel to the information-recorded surface of an optical disc.

To achieve the above object of the present invention, there is provided an objective lens driving apparatus for an optical pickup including tracking coils mounted on the lens holder holding the objective lens, a permanent magnet forming a magnetic field for laying at least a part of the tracking coil within the magnetic field, and a yoke member constituted by an outer yoke where the permanent magnet is retained and an inner yoke placed between the permanent magnet and the lens holder, wherein the inner yoke is separately formed in two sections, and the tracking coils are twice bent at right angles to wrap around the front, rear and one side of each inner yoke, to thereby drive the lens holder parallel to the information-recorded surface of the optical disc, according to the direction of the current flowing in the vertical portions of the front part of each tracking coil.

According to the present invention, even though the electromagnetic force which is not necessary for controlling the tracking, is generated in the upper and lower parts of a pair of tracking coils opposing the permanent magnet, the moment generated in the upper and lower parts of the tracking coil offset each other, so that each lens holder is driven parallel to the information-recorded surface of an optical disc without being inclined. Accordingly, in the objective lens driving apparatus of the present invention, a light beam emitted from the objective lens is irradiated on the information-recorded surface without its axis being inclined, so that precise light beam pickup is possible. Also, opposite electromagnetic forces are generated parallel to the information-recorded surface of the optical disc in each of the front and rear parts of the tracking coil, namely, the part of the tracking coil opposing the permanent magnet and the part attached to the lens holder. However, since the magnetic force of a part of the tracking coil attached to the lens holder is weaker than that of the tracking coil opposing the permanent magnet, there is no great effect in driving the lens holder. Therefore, an optical pickup having a lens holder whose driving range is wider than that of a conventional optical pickup can be realized.

BRIEF DESCRIPTION OF THE DRAWINGS

Other objects and features of the invention will be more fully understood from the following detailed description and appended claims when taken with the accompanying drawings, in which:

FIGS. 5A and 5B are plan views showing other embodiments of the present invention; and FIG. 6 is a schematic sectional view for explaining the operation of the objective lens driving apparatus of the present invention.

DETAILED DESCRIPTION OF THE INVENTION

Figure 1:
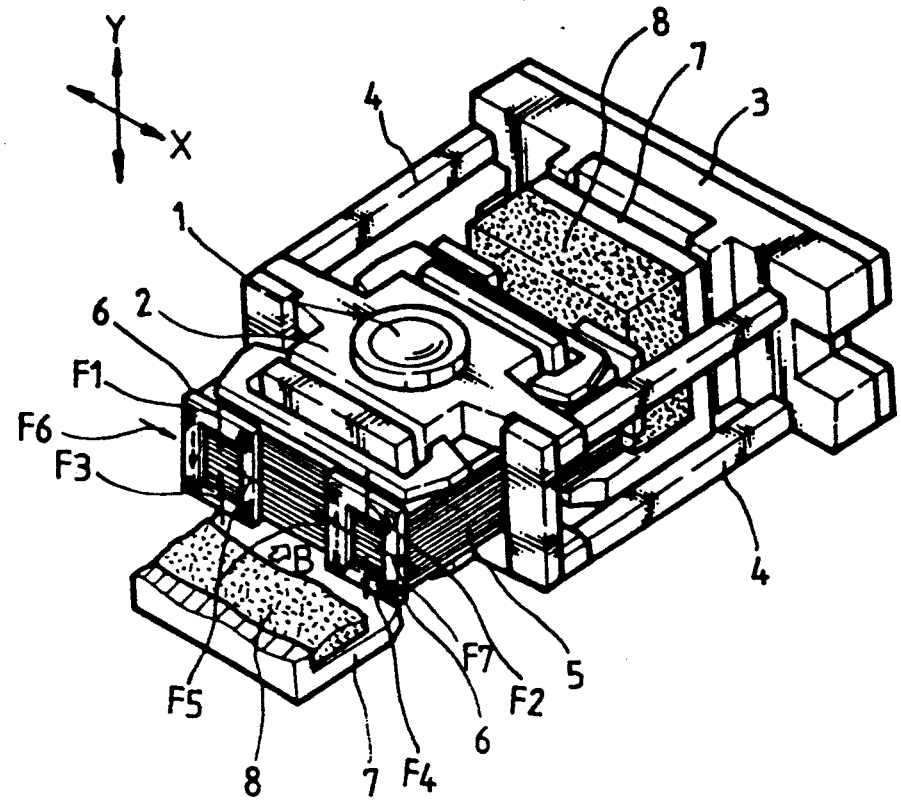
FIG. 1 is a partially cut-away perspective view of the objective lens driving apparatus for the conventional optical pickup.
Figure 2:
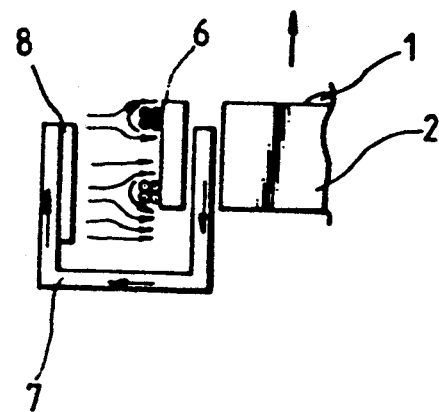
FIG. 2 is a schematic sectional view for explaining the operation of the conventional objective lens driving apparatus.
Figure 3:
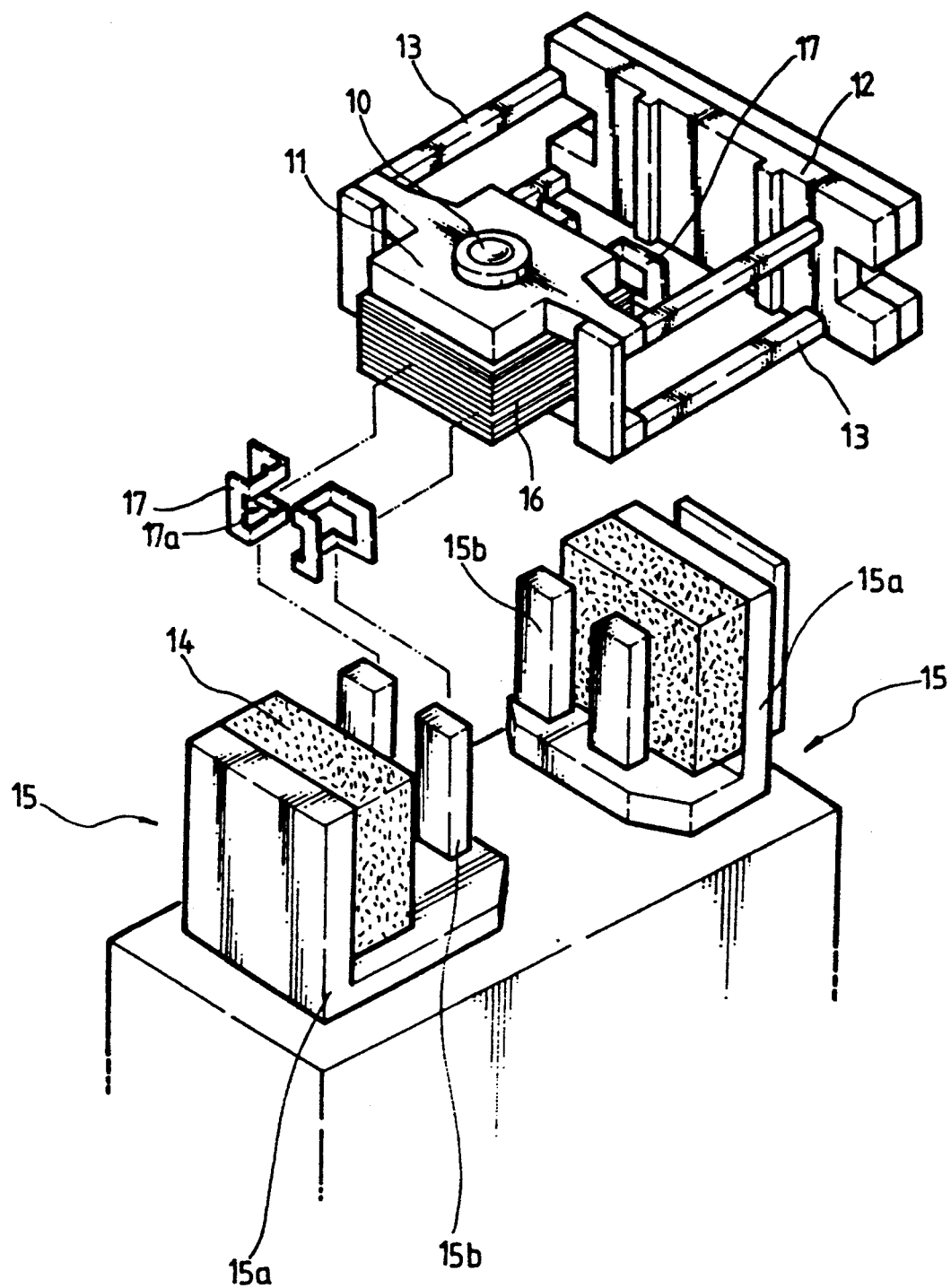
FIG. 3 is a separated perspective view of the objective lens driving apparatus of an optical pickup according to the present invention.

Referring to FIG. 3, reference numeral 10 designates an objective lens opposed to an optical disc (not shown). Objective lens 10 is held by a lens holder 11. Lens holder 11 is finely movably supported by four supporting rods 13 with respect to a fixed member 12. Each supporting rod 13 is formed of an elastic material such as rubber. A yoke 15 constituted by an inner yoke 15b divided into two parts and an outer yoke 15a where a permanent magnet 14 is retained, is placed in such a manner that permanent magnet 14 opposes the vertical surface of lens holder 11. Both parts of inner yoke 15b have rectangular cross-sections. A focusing coil 16 is wound around the vertical outer periphery of lens holder 11, and tracking coils 17 are fixed to the outer periphery of focusing coil 16.

Figure 4:
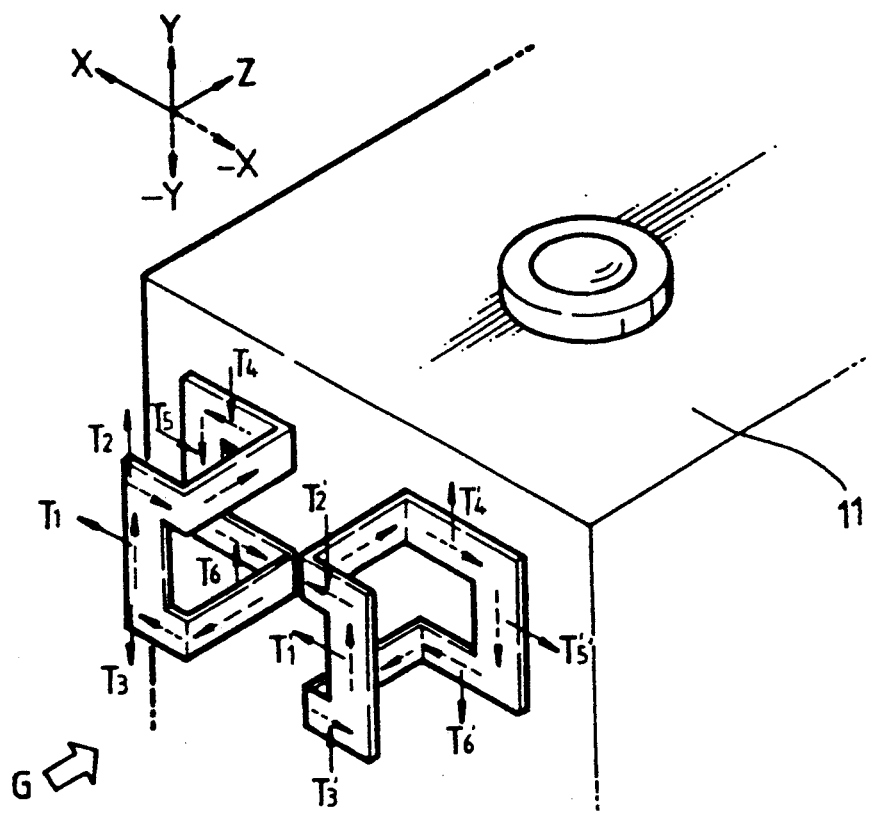
FIG. 4 is a schematic diagram for explaining the operation of the present invention.

Tracking coils 17 are characteristic elements of the present invention and are shown in FIG. 3 and FIG. 4. Here, tracking coil 17, twice bent at right angles so that it wraps around three faces of inner yoke 15b, is formed by being spirally wound, and has a planar, rectangular shape with an opening 17a therein. Both sides of such tracking coils 17 are rectangularly bent to wrap around three faces of inner yoke 15b, with one side fixed to focusing coil 16. The reason for having opening 17a in tracking coil 17, is to prevent increasing the inductance of the coil. Namely, the front part of tracking coils 17 opposes permanent magnet 14, its rear part is fixed to focusing coil 16, and inner yoke 15b is placed between the front and rear parts.

Referring to FIG. 4, the current represented by dotted arrows in tracking coil 17, flows in three directions in each of the front and rear parts of tracking coil 17. That is, the current in the horizontally oriented (X-axis) portions of tracking coil 17 flows such that the current direction in the upper part of the tracking coil, is opposite that in the lower part, while the current of tracking coil 17 in the vertical portion (Y-axis) flows vertically. This tridirectional current flows in the rear part of tracking coil 17 in the same manner as that in its front part.

In the above structure, the orientation of tracking coil 17 is such that their opened portions face each other, but as shown in FIGS. 5A and 5B, their opened portions 17a may face in the same direction or in opposite directions.

In operation, lens holder 11 is driven by the current flowing in focusing coil 16 and the magnetism of magnets 14, so as to effect the focusing correction along the Y-axis. In such a focusing correcting operation, a detecting beam emitted from objective lens 10 onto the information-recorded surface of the optical disc, is projected such that it is always focused on the recorded surface. Further, lens holder 11 is driven by the current vertically flowing in vertically arranged portions of tracking coils 17 as well as the magnetism of magnets 14, so as to effect the tracking correction in the X-axis direction. In such a tracking correcting operation, detecting beam emitted from objective lens 11 is projected onto the information-recorded surface of the optical disc, to precisely scan the information track of the recorded surface.

As described above, the precise tracking correction operation will be demonstrated in the below explanation.

Referring again to FIG. 4, supposing that the magnetism is in the direction G and the detecting current flows as indicated by the dotted arrows, an electromagnetic force having the direction as illustrated, is generated in the current direction of the front and rear parts of tracking coil 17. That is, electromagnetic forces T1 and T1' are generated in the direction of the positive X-axis with respect to each vertical portions of the front parts of tracking coils 17, and electromagnetic forces T5 and T5' are generated in the negative X-axis direction with respect to each vertical portion of their rear parts. Further, electromagnetic forces T2, T2', T3 and T3' are generated in the horizontal portions of the fronts parts of tracking coils 17, and electromagnetic forces T4, T4', T6 and T6' are generated in their rear portions. Electromagnetic forces T5 and T5' having a magnetic effect much weaker than that of electromagnetic forces T1 and T1', have no influence on the relative movement of lens holder 11. Electromagnetic forces T2, T2', T3, T3' and T4, T4', T6, T6' are unnecessary for the tracking control of lens holder 11, and offset each other. That is, referring to FIGS. 4 and 6, when lens holder 11 moves toward the positive Y direction by the focusing correction operation as shown in FIG. 6, a part of tracking coil 17 escapes from the influence of the magnetic field. However, the difference between the moment of electromagnetic forces T2 and T2' and the moment of electromagnetic forces T3 and T3', and the difference between the moment of electromagnetic forces T4 and T4' and the moment of electromagnetic forces T6 and T6', are almost the same, each being in opposite directions, thereby offsetting each other.

The objective lens driving apparatus of the optical pickup according to the present invention, has the following effect.

First of all, in FIG. 4, since tracking coils 17 are bent at right angles to wrap around the three faces of inner yoke 15b, the front parts of tracking coil 17 are placed between inner yoke 15b and outer yoke 15a having a large magnetic force, and the rear part of tracking coil 17 is placed on the outer side of inner yoke 15b having a relatively small magnetic force. Accordingly, when comparing electromagnetic forces T2, T2', T3, and T3' generated at the front portion of tracking coil 17 with electromagnetic forces T4, T4', T6, and T6' generated at its rear portion, the respective differences of their moments are approximately the same and their directions are opposite, so that the two forces offset each other. As a result, if the electromagnetic force for rotating lens holder 11 is offset when lens holder 11 is finely moved in the X-axis direction to carry out the tracking correction operation, lens holder 11 can perform the tracking correction operation without being inclined. Therefore, the detecting beam emitted from objective lens 10 precisely scans the recorded surface of the optical disc without the optical axis being inclined. Also, electromagnetic forces having opposite directions and parallel to the information-recorded surface of the optical disc are respectively generated in the front and rear parts of tracking coil 17, namely, that part of the tracking coil which opposes permanent magnet 14 and the part attached to lens holder 11. The part of the tracking coil that is attached to lens holder 11 has a weaker magnetic force than that opposing permanent magnet 14, and so does not affect driving lens holder 11. Accordingly, the objective lens driving apparatus of the present invention in which the driving force for driving lens holder 11 is larger than that of the conventional one, obtains an optical pickup having a wide driving range. Also, even though the other embodiments of the present invention illustrated in FIGS. 5A and 5B are not described in detail, it should be clear that the same effects as aforementioned are obtained, so their detailed description is omitted.

As mentioned above, the objective lens driving apparatus of the present invention obtains an optical pickup capable of controlling a stable lens holder position, and a precise light beam, thereby increasing product value.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An objective lens driving apparatus for an optical pickup comprising:

a lens holder for holding an objective lens;

a plurality of tracking coils mounted on said lens holder;

a pair of permanent magnets, a first one of said pair of permanent magnets forming a first magnetic field, and a second one of said pair of permanent magnets forming a second magnetic field, whereas at least part of each of said plurality of tracking coils are within one of said first and second magnetic fields; and a pair of yoke members, each of said pair of yoke members constituted by an outer yoke retaining one of said pair of permanent magnets and an inner yoke placed between one of said pair of permanent magnets and said lens holder, wherein each of said inner yokes is separately formed into two yoke sections, and each one of a pair of said plurality of tracking coils are twice bent at right angles to wrap around a front, rear and a first side of a corresponding one of said two yoke sections, to thereby drive said lens holder parallel to an information-recorded surface of an optical disc according to current flowing in each one of said pair of said plurality of tracking coils in a direction parallel to an axis of rotation of said optical disc.

2. An objective lens driving apparatus as claimed in claim 1, wherein each of said plurality of tracking coils is spirally wound so as to be in a planar, rectangular shape and then both ends are bent at right angles.

3. An objective lens driving apparatus as claimed in claim 2, wherein an inductance of each of said plurality of tracking coils is decreased due to an opening placed in a center portion of each of said plurality of tracking coils.

4. An objective lens driving apparatus as claimed in claim 1, wherein a second side of a first one of said two yoke sections faces a second side of a second one of said two yoke sections, when each one of said tracking coils are twice bent at right angles wrap around said front, rear and first side, but not said second side, of corresponding one of said two yoke sections.

5. An objective lens driving apparatus as claimed in claim 1, wherein a second side of a first one of said two yoke sections faces the same direction as a second side of a second one of said two yoke sections, when each one of said pair of tracking coils twice bent at right angles wrap around said front, rear and first side, but not said second side, of said corresponding one of said two yoke sections.

6. An objective lens driving apparatus as claimed in claim 1, wherein a second side of a first one of said two yoke sections, faces a direction opposite to a second side of a second one of said two yoke sections, when each one of said pair of said tracking coils twice bent at right angles wrap around said front, rear and first side, but not said second side of said corresponding one of said two yoke sections.

7. An objective lens driving apparatus as claimed in claim 1, wherein each of said yoke sections has a rectangular cross-section for having one of said plurality of tracking coils wrap around said corresponding one of said yoke sections.

8. An objective lens driving apparatus for an optical pick up, comprising:

an objective lens for directing light beams onto an information recorded surface of an optical disc;

a lens holder, for holding said objective lens, a focusing coil, wound around a periphery of said lens holder, for driving said lens holder in a direction of an optical axis of said objective lens;

a plurality of tracking coils, rectangular in shape and twice bent at right angles, affixed to an outer periphery of said focusing coil, for driving said lens holder in a direction parallel to the information recorded surface of the optical disc;

permanent magnets for interacting with said focusing coil and said plurality of tracking coils to drive said lens holder; and yoke members, each of said yoke members comprising:

an outer yoke for retaining one of said permanent magnets; and an inner yoke, formed in a pair of rectangular parallelepipeds, one of each of said plurality of tracking coils wrapped around three sides of a corresponding one of said pair of rectangular parallelepipeds.

9. An objective lens driving apparatus as claimed in claim 8, wherein each of said plurality of tracking coils is spirally wound so as to be in a planar, rectangular shape and then both ends are bent at right angles.

10. An objective lens driving apparatus as claimed in claim 9, wherein an inductance of each of said plurality of tracking coils is decreased due to an opening placed in a center portion of each of said plurality of tracking coils.

11. A method of controlling a tracking of optical recording media using a lends holder, an objective lens supported by the lens holder, a focusing coil, four tracking coils, a pair of outer yokes, a pair of inner yokes, and only a pair of permanent magnets, each one of said pair of permanent magnets located between a corresponding one of said pair of outer yokes and a corresponding one of said pair of inner yokes, wherein each one of said pair of inner yokes is separately formed into two yoke sections and placed on opposite sides of said lends holder, each one of said pair of inner yokes being closer to the lens holder than said corresponding one of said pair outer yokes, said method comprising the steps of:

driving said lens holder in a direction of an optical axis of said objective lens by an electromagnetic circuit made by current flowing in said focusing coils and a magnetic force of said permanent magnets;

driving said lens holder in a direction parallel to an information recorded surface of an optical disc by an electromagnetic circuit made by current flowing in sadi tracking coils and the magnetic force of said permanent magnets; and preventing the optical axis of said objective lens from inclining when said lens is driven in the direction of the optical axis by causing current to flow in said tracking coils, wherein each one of said tracking coils are twice bent at right angles and wrapped around a front, a rear and one side of a corresponding one of said yoke sections.

12. A method as claimed in claim 11, said step of preventing the optical axis of said objective lens from inclining further comprising the step of offsetting a moment generated in an upper part and a lower part of each of said tracking coils.

13. An objective lens driving apparatus for an optical pick up, comprising:

an objective lens for directing light beams onto an information recorded surface of an optical disc;

a lens holder, for holding said objective lens;

a focusing coil, wound around a periphery of said lens holder, for driving said lens holder in a direction of an optical axis of said objective lens;

four tracking coils, rectangular in shape and twice bent at right angles, a first pair of said tracking coils affixed to an outer periphery of said focusing coil on a first side of said lens holder and a second pair of said tracking coils affixed to said outer periphery on a second side of said lens holder, said second side of said lens holder being opposite to said first side of said lens holder, said four tracking coils for driving said lens holder in a direction parallel to a surface of the optical disc;

a pair of permanent magnets, a first one of said pair of permanent magnets located on said first side of said lens holder and a second one of said pair of permanent magnets located on said second side of said lens holder, said pair of permanent magnets for interacting with said focusing coil and said plurality of tracking coils to drive said lens holder; and a pair of yoke members, each of said pair of yoke members comprising:

an inner yoke for retaining one of said pair of permanent magnets; and an inner yoke, formed in a pair of rectangular parallelepipeds, one of each of said plurality of tracking coils wrapped around three sides of a corresponding one of said pair of rectangular parallelepipeds.

14. An objective lens driving apparatus for driving an objective in a first direction parallel an axis of rotation of an optical disk and a second direction parallel to a surface the optical disk, said objective lens driving apparatus comprising:

a lens holder, having four sides disposed in said first direction, for holding the objective lens;

a first permanent magnet located on a first side of said four sides of said lens holder;

a second permanent magnet located on a second side of said four sides of said lens holder, said second side of said lens holder being opposite said first side of said lens holder;

a first outer yoke for retaining said first permanent magnet;

a second outer yoke for retaining said second permanent magnet;

a first pair of inner yoke sections located between said first permanent magnet and said lens holder, each one of said first pair of inner yoke sections having a rectangular cross-section and four sides disposed in said first direction;

a second pair of inner yoke sections located between said second permanent magnet and said lens holder, each one of said second pair of inner yoke sections having a rectangular cross-section and four sides disposed in said first direction;

a focusing coil, wound around said four sides of said lens holder, for driving said lens holder in said first direction;

a first pair of tracking coils, each one of said first pair of tracking coils attached to said focusing coil on said first side of said lens holder, being spirally wound to form a rectangular shape, then twice bent at right angles, to wrap around a first, second and third side of said four sides of a corresponding one of said first pair of inner yoke sections; and a second pair of tracking coils, each one of said second pair of tracking coils attached to said focusing coil on said second side of said lens holder, being spirally wound to form a rectangular shape, then twice bent at right angles, to wrap around a first, second and third side of said four sides of a corresponding one of said second pair of inner yoke sections.

15. The objective lens driving apparatus as claimed in claim 14, wherein a fourth side of said four sides of a first one of said first pair of inner yoke sections faces a fourth side of said four sides of a second one of said first pair of inner yoke sections and a fourth side of said four sides of a first one of said second pair of inner yoke sections faces a fourth side of said four sides of a second one of said second pair of inner yoke sections.

16. The objective lens driving apparatus as claimed in claim 14, wherein a fourth side of said four sides of a first one of said first pair of inner yoke sections faces a same direction as a fourth side of said four sides of a second one of said first pair of inner yoke sections and a fourth side of said four sides of a first one of said second pair of inner yoke sections faces a same direction as a fourth side of said four sides of a second one of said second pair of inner yoke sections.

17. The objective lens driving apparatus as claimed in claim 14, wherein a fourth side of said four sides of a first one of said first pair of inner yoke sections faces an opposite direction as a fourth side of said four sides of a second one of said first pair of inner yoke sections and a fourth side of said four sides of a first one of said second pair of inner yoke sections faces an opposite direction as a fourth side of said four sides of a second one of said second pair of inner yoke sections.

18. The objective lens driving apparatus as claimed in claim 14, wherein a fourth side of said four sides of each one of said first pair of inner yoke sections and a fourth side of said four sides of each one of said second pair of inner yoke sections faces in said section direction.

* * * * *

UNITED STATES PATENT AND TRADEMARK OFFICE
CERTIFICATE OF CORRECTION

PATENT NO. : 5,285,434
DATED : February 8, 1994
INVENTOR(S) : Chun-dong Kim; et al.

It is certified that error appears in the above-indentified patent and that said Letters Patent is hereby corrected as shown below:

Column 7,

Line 31,    Change "lends" to --lens-- ;

Line 39,    Change "lends" to --lens-- ;

Line 51,    Change "sadi" to --said-- .

Signed and Sealed this

Eighteenth Day of October, 1994

Attest:

BRUCE LEHMAN

*Attesting Officer*    *Commissioner of Patents and Trademarks*